(12) United States Patent
Weng et al.

(10) Patent No.: US 10,668,428 B2
(45) Date of Patent: Jun. 2, 2020

(54) APPARATUS AND METHODS FOR ENHANCING GAS-LIQUID CONTACT/SEPARATION

(71) Applicant: HONEYWELL INTERNATIONAL INC., Morris Plains, NJ (US)

(72) Inventors: Dacong Weng, Rancho Palos Verdes, CA (US); Stephen Yates, South Barrington, IL (US); Alexander Bershitsky, Northbrook, IL (US); Ted Bonk, Cave Creek, AZ (US); Phoebe Henson, Scottsdale, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 311 days.

(21) Appl. No.: 15/422,170

(22) Filed: Feb. 1, 2017

(65) Prior Publication Data

US 2018/0056234 A1 Mar. 1, 2018

Related U.S. Application Data

(60) Provisional application No. 62/382,854, filed on Sep. 2, 2016, provisional application No. 62/378,863, filed on Aug. 24, 2016.

(51) Int. Cl.
*B01D 53/14* (2006.01)
*B01D 53/18* (2006.01)
*B64G 1/48* (2006.01)

(52) U.S. Cl.
CPC .......... *B01D 53/18* (2013.01); *B01D 53/1425* (2013.01); *B01D 53/1475* (2013.01); *B64G 1/48* (2013.01); *B01D 2252/30* (2013.01); *B01D 2257/708* (2013.01); *B01D 2259/4575* (2013.01); *Y02C 10/06* (2013.01)

(58) Field of Classification Search
CPC .......... B01D 2252/30; B01D 2257/708; B01D 2259/4575; B01D 53/1425; B01D 53/1475; B01D 53/18; B64G 1/48; Y02C 10/06
See application file for complete search history.

(56) References Cited

U.S. PATENT DOCUMENTS 2,941,872 A 6/1960 Pilo et al.
3,632,519 A 1/1972 Gustafson
(Continued)

OTHER PUBLICATIONS

Liang-Liang Zhang et al, "Absorption of Carbon Dioxide with Ionic Liquid in a Rotating Packed Bed Contactor: Mass Transfer Study", Industrial & Engineering Chemistry Research, American Chemical Society, 2011, 50, pp. 6957-6964.
(Continued)

*Primary Examiner* — Cabrena Holecek
(74) *Attorney, Agent, or Firm* — Lorenz & Kopf, LLP (57) ABSTRACT

An environmental control system includes an air conditioning subsystem; a mix manifold downstream of the air conditioning subsystem and upstream of an environment to be conditioned; and a contaminant removal subsystem downstream of the environment to be conditioned. The contaminant removal subsystem includes a first gas-liquid contactor-separator. The first gas-liquid contactor-separator includes a first rotating porous bed that provides a heat/mass transfer surface for contact between a contaminated air from the environment and a liquid absorbent.

4 Claims, 9 Drawing Sheets

(56) References Cited

U.S. PATENT DOCUMENTS

| | | | |
|---|---|---|---|
| 4,015,960 | A | 4/1977 | Nutter |
| 4,217,237 | A | 8/1980 | Sartori et al. |
| 4,285,918 | A | 8/1981 | Gustafson |
| 4,382,045 | A | 5/1983 | Wem |
| 4,692,283 | A | 9/1987 | Wem et al. |
| 5,145,314 | A | 9/1992 | Westhoff, Jr. et al. |
| 5,318,758 | A | 6/1994 | Fujii et al. |
| 5,332,501 | A | 7/1994 | Mangialardi |
| 6,364,940 | B1 | 4/2002 | Prueter et al. |
| 6,627,166 | B1 | 9/2003 | Simon |
| 7,252,703 | B2 | 8/2007 | MacKnight |
| 7,429,299 | B2 | 9/2008 | McGlinchy et al. |
| 7,527,775 | B2 | 5/2009 | Chinn et al. |
| 7,662,220 | B2 | 2/2010 | Fukano et al. |
| 7,905,360 | B2 | 3/2011 | Della Casa |
| 8,167,979 | B2 | 5/2012 | Hintz |
| 8,790,445 | B2 | 7/2014 | Gu et al. |
| 8,952,193 | B2 | 2/2015 | Davis, Jr. |
| 8,974,567 | B2 | 3/2015 | Verdegan et al. |
| 9,028,785 | B2 | 5/2015 | Kortunov et al. |
| 9,168,475 | B2 | 10/2015 | Dorao et al. |
| 9,186,617 | B2 | 11/2015 | Calabro et al. |
| 9,186,618 | B2 | 11/2015 | Baugh et al. |
| 9,216,377 | B1 * | 12/2015 | Dutra E Mello .. B01D 53/1493 |
| 9,339,757 | B2 | 5/2016 | Jayaweera et al. |
| 2014/0290486 | A1 | 10/2014 | Todd, IV et al. |
| 2015/0023807 | A1 | 1/2015 | Cherry et al. |

OTHER PUBLICATIONS

Stephen F. Yates et al, "Direct Liquid Contact—Next Generation Approach to Combined CO2 Recovery and Humidity Control for Extended Missions", AIAA Space 2016, AIAA Space Forum, (AIAA 2016-5462).

* cited by examiner

| PROPERTY | VALUE | TEMPERATURE/WATER CONCENTRATION |
|---|---|---|
| MOLECULAR WEIGHT (g/mol) | 198.26 | |
| DENSITY (g/mL) | 1.055 | 25°C/ANHYDROUS |
| SURFACE TENSION (mN/m) | 36.4 | 25°C/ANHYDROUS |
| HEAT CAPACITY (J/mol·°K) | 210 | 25°C/ANHYDROUS |
| ONSET OF THERMAL DEGRADATION (°C) | 216 | |
| VISCOSITY (mPa·s) | 406 | 30°C/ANHYDROUS |
| | 263 | 30°C/2% WATER |
| | 152 | 30°C/5.5% WATER |
| | 111 | 50°C/ANHYDROUS |
| | 79 | 50°C/2% WATER |
| | 52 | 50°C/5.5% WATER |

FIG. 8
TABLE 1

APPARATUS AND METHODS FOR ENHANCING GAS-LIQUID CONTACT/SEPARATION

BACKGROUND OF THE INVENTION

The present invention generally relates to contaminant removal and, more particularly, to apparatus and methods of contaminant removal employing gas-liquid contact and separation.

It is of great interest to control and limit the concentration of carbon dioxide in occupied spaces, including homes, buildings, transportation vehicles, aircraft and spacecraft. Higher concentrations of carbon dioxide in the air are uncomfortable, and studies have shown that the ability of individuals to concentrate or make correct decisions is impaired. It is particularly important to control carbon dioxide concentrations in enclosed vehicles like aircraft or spacecraft. In aircraft, fresh air enters the occupied space as bleed air from the engine, and results in increased fuel consumption. In spacecraft, no fresh air is available, and the cabin air must be preserved in a healthful condition. For aircraft, the FAA limits the acceptable concentration of carbon dioxide to 5000 ppm, while aircraft currently have 1500-2300 ppm. Decreasing the bleed air flow would improve fuel efficiency, but would require a technology to remove carbon dioxide from the air.

High levels of carbon dioxide in the International Space Station (ISS) are resulting in headaches, fatigue and eye degeneration in astronauts. Deep Space Missions lengthen crew exposure to these conditions. Therefore, CO2 removal systems for next generation deep space vehicles are required to maintain a much lower CO2 partial pressure. In addition, deep space vehicles are required to have a lower size, weight, power, and thermal load, and use fewer consumables, while fixing existing safety problems that are apparent in current systems. The maintenance interval of current systems (three to six months) is also required to jump to three years.

Long duration, deep space missions require a more advanced life support system than that used on shorter missions or on the ISS. Crewed missions to Mars are likely to last for over thirty months, and little provision for spares or consumables is possible. There will be four to six crew members and the occupied space will be 65.8 m$^3$ in one configuration.

Carbon dioxide recovery is a critical component of the air revitalization system for such missions. Carbon dioxide must be removed from the vessel atmosphere and maintained below 2 torr (2666 ppm) (calculated at 1 atm) to preserve crew health, and maintain alertness and comfort. This carbon dioxide should not be discarded to space, as it was in shorter missions or as it often is on the ISS, but should instead be converted to oxygen and carbon in order for the oxygen to be recycled back to the cabin. Any significant loss in carbon dioxide entails increases in the amount of oxygen or water required to be brought with the mission. For missions to Mars, some plans include landing on the planet and remaining there for eighteen months, during which the Mars Transfer Habitat remains in Mars orbit, unoccupied. The life support system would remain in an operational ready state during this period able to resume operation with high reliability for the return flight quickly.

As can be seen, there is a need for improved apparatus and methods to remove contaminants from a supply air in environments such as deep space vehicles.

SUMMARY OF THE INVENTION

In one aspect of the present invention, an environmental control system comprises an air conditioning subsystem; a mix manifold downstream of the air conditioning subsystem and upstream of an environment to be conditioned; a contaminant removal subsystem downstream of the environment to be conditioned; wherein the contaminant removal subsystem includes a first gas-liquid contactor and separator; and wherein the first gas-liquid contactor and separator includes a first rotating porous bed that provides a heat/mass transfer surface for contact between a contaminated air from the environment and a liquid absorbent.

In another aspect of the present invention, a contaminant removal subsystem configured to receive filtered air from a filter downstream of an environment suitable for humans, wherein contaminated air is discharged from the environment to the filter, and the contaminant removal subsystem is further configured to discharge cleaned air to a photocatalytic oxidizer, the contaminant removal subsystem comprises a scrubber-separator that includes a first rotating porous bed; wherein the scrubber-separator receives the filtered air and a clean liquid absorbent, and discharges the cleaned air and a used liquid absorbent; wherein the cleaned air contains a lower concentration of gas contaminant than the contaminated air; wherein the used liquid absorbent includes gas contaminant absorbed into clean liquid absorbent; wherein the first rotating porous bed separates gas contaminant from contaminated air; a first heat exchanger directly downstream, in terms of liquid absorbent flow, of the scrubber-separator whereby there is an absence of subsystem components therebetween other than ducting for a flow of fluid; a heater directly downstream, in terms of liquid absorbent flow, of the first heat exchanger whereby there is an absence of subsystem components therebetween other than ducting for the flow of fluid; a stripper-separator directly downstream, in terms of liquid absorbent flow, of the heater whereby there is an absence of subsystem components therebetween other than ducting for the flow of fluid; wherein the stripper-separator is configured to receive air from a source other than the environment; wherein the stripper-separator desorbs gas contaminant from the used liquid absorbent to produce a regenerated liquid absorbent; wherein the stripper-separator is directly upstream, in terms of regenerated liquid absorbent flow, of the first heat exchanger whereby there is an absence of subsystem components therebetween other than ducting for the flow of fluid; a clean liquid absorbent storage directly downstream, in terms of regenerated liquid absorbent flow, of the first heat exchanger whereby there is an absence of subsystem components therebetween other than ducting for the flow of fluid; a second heat exchanger directly downstream, in terms of regenerated liquid absorbent flow, of the clean liquid absorbent storage whereby there is an absence of subsystem components therebetween other than ducting for the flow of fluid; wherein the second heat exchanger is directly upstream, in terms of regenerated liquid absorbent flow, of the stripper-separator whereby there is an absence of subsystem components therebetween other than ducting for the flow of fluid; and a contaminant gas-water separator downstream, in terms of gas contaminant, of the stripper-separator.

In a further aspect of the present invention, a gas-liquid contactor and separator comprises an inlet that discharges a first flow of contaminated air having a gas contaminant; a nozzle that discharges a second flow of droplets of clean liquid absorbent; wherein the first and second flows are co-current to one another; a rotating porous bed that is configured to: enhance contact, with centrifugal force and without the need for gravity, clean liquid absorbent droplets with contaminated air; enhance transfer with the centrifugal force and without the need for gravity, gas contaminant to clean liquid absorbent droplets to thereby produce a used liquid absorbent and a cleaned air.

These and other features, aspects and advantages of the present invention will become better understood with reference to the following drawings, description and claims.

BRIEF DESCRIPTION OF THE DRAWINGS

FIGS. 3A-3B are exploded views of FIG. 3, where FIG. 3B is the rotating section of the gas-liquid contact separator;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention can be integrated into environments such as spacecraft used in long-duration missions, specifically, space stations and spacecraft and habitats used beyond low earth orbit, as the invention can be gravity independent for gas/liquid separation The present invention may also be used for aircraft, as another example.

The present invention may be part of an environmental control system. The present invention can provide a contaminant (e.g., CO2) removal subsystem that may interface with an upstream temperature and humidity control device which interfaces with an environment for occupants, such as a cabin. Downstream of this removal subsystem, water may be stored for water processing, whereas a contaminant outlet may interface with a contaminant reduction subsystem. It will be understood by those skilled in the art that incorporation of a contaminant removal subsystem into an integrated environmental control system will be desirable in some applications, including aircraft cabins, but for other applications, the subsystem may be operated as an independent unit, or integrated with other subsystems which convert carbon dioxide into oxygen and other byproducts.

The contaminant removal subsystem of the present invention can use a liquid-based architecture, ionic liquid contaminant absorbents, spray gas-liquid contactors, and/or centrifugal separators to provide performance, reliability, and safety, while lowering the size, weight, power, thermal load and amount of consumables needed. In addition, the present invention can aid with humidity removal, temperature control and trace gas contamination removal.

In various embodiments, the present invention may include a liquid-based contaminant (e.g., CO2) removal architecture having: 1) an ionic liquid(s) having a high contaminant loading capacity and a high rate of absorption; 2) a contactor(s) such as a spray contactor, a static mixer, and/or a packed bed; and 3) a separator(s) to provide gas-liquid separation, all of which can provide gravity independent operation. In embodiments, the contactor and separator may be integrated as a single component.

U.S. patent application entitled "Ionic Liquid CO2 Scrubber for Spacecraft" filed concurrently with this application is incorporated herein by reference as though fully set forth herein.

Herein, the term "absorbent" is intended to generally include absorbents and/or adsorbents.

Figure 1:
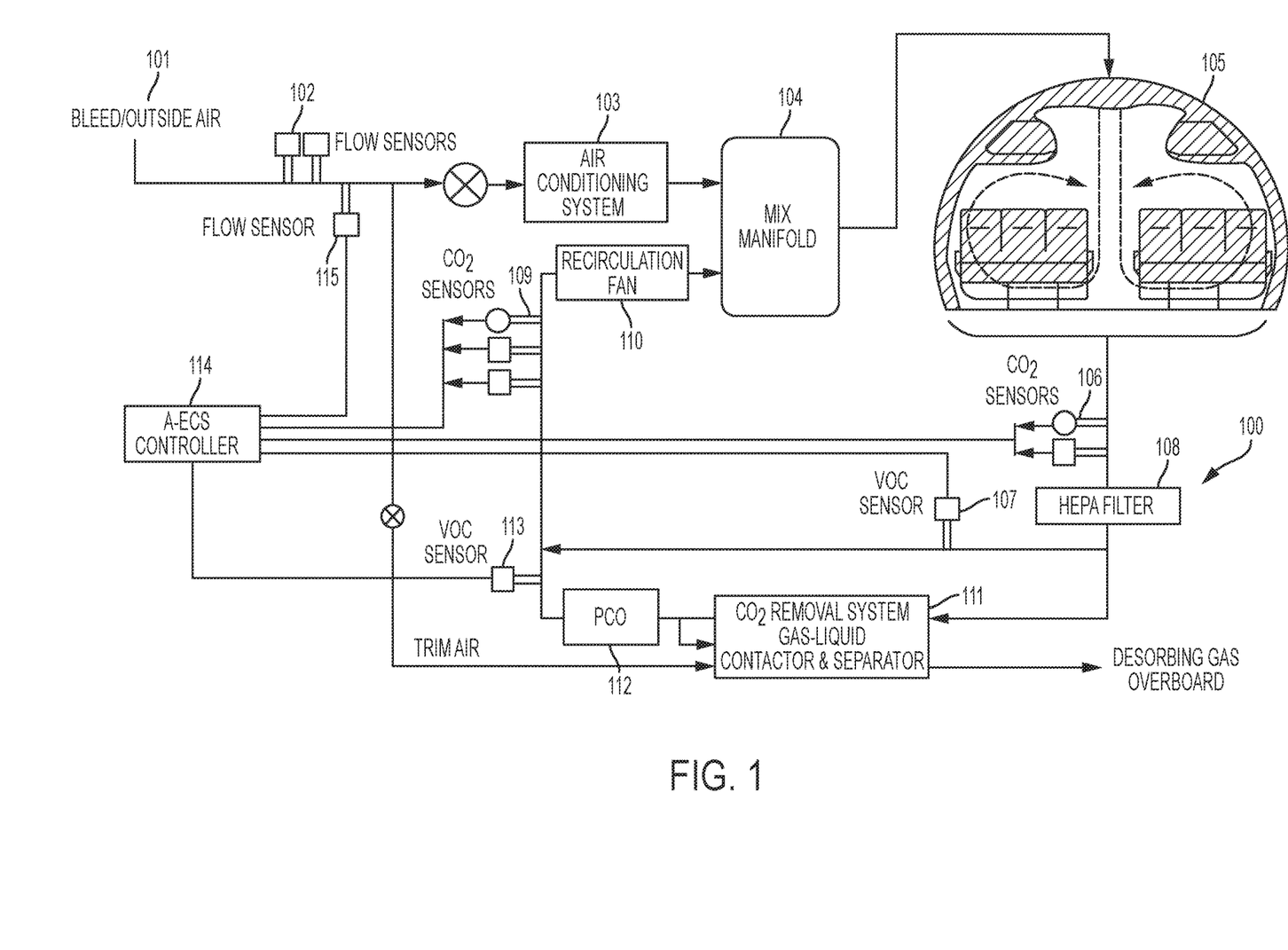
FIG. 1 is a schematic diagram of an environmental control system (ECS) in accordance with an exemplary embodiment of the invention.

FIG. 1 is a schematic diagram of an exemplary embodiment of an environmental control system (ECS) 100 according to the present invention. The ECS 100 may receive an outside air 101 which, for example, may be a bleed air when the ECS 100 is implemented for an aircraft. The outside air 101 may flow to one or more sensors 102 that may sense characteristics of the outside air 101, such as temperature and/or humidity.

From the one or more sensors 102, the outside air 101 may flow to one or more sensors 115 that may sense characteristics of the air 101 such as temperature, pressure and/or humidity. Once past the sensor(s) 115, the outside air 101 may be conditioned by an air conditioning subsystem 103, which conditioning may include temperature, pressure and/or humidity.

Conditioned air may flow from the air conditioning subsystem 103, through a mix manifold 104, and into an environment 105 to be conditioned. The environment 105 may be an enclosed area for occupants, such as a cabin of an aircraft. In the environment 105, the conditioned air may acquire contaminants, such as from occupants in the environment 105, and produce a contaminated air.

Upon exiting the environment 105, the contaminated air may be sensed by one or more gas contaminant sensors 106. The sensor(s) 106 may sense one or more gas contaminants, such as CO2. Once past the sensor(s) 106, the contaminated air may be filtered by a filter 108. A part of filtered air from the filter 108 may be sensed by one or more VOC sensor(s) 107 that may sense one or more volatile organic compounds (VOCs). After the sensor(s) 107, a part of a filtered air from the filter 108 may move into a recirculation fan 110. From the recirculation fan 110, the filtered air may be forced into the mix manifold 104 where the filtered air can be mixed with the conditioned air from the air conditioning subsystem 103.

Instead of and/or in addition to the filtered air moving through the fan 110, a part of filtered air from the environment 105 may move through a contaminant removal subsystem 111. The removal subsystem 111 may remove one or more gas contaminants sensed by the one or more sensors 106. The contaminant removal subsystem 111 may, in various embodiments, include one or more gas-liquid contactor and separators, such as those described below, to effectuate removal of gas contaminants. However, the present invention envisions that gas-liquid contactor and separators, other than those described below, can be employed.

Within the contaminant removal subsystem 111, a used liquid absorbent may be produced. "Used liquid absorbent" means "clean liquid absorbent" that has absorbed gas contaminant(s). "Clean liquid absorbent" means liquid absorbent that is substantially free of absorbed gas contaminant(s).

Also within the contaminant removal subsystem 111, a regenerated liquid absorbent may be produced. "Regenerated liquid absorbent" means used liquid absorbent that has undergone desorption of gas contaminant(s).

Additionally within the contaminant removal subsystem 111, a cleaned air may be produced. "Cleaned air" means air that has an insubstantial amount of gas contaminant(s) and/or H2O. In embodiments, "cleaned air" has a gas contaminant(s) and/or H2O concentration less than that of the outside air 101 and/or less than that of the contaminated air from the environment 105.

Cleaned air from the subsystem 111 may flow into a photocatalytic oxidizer (PCO) 111 to remove one or more VOCs and thereby produce a further cleaned air. One or more VOC sensors 113 may be downstream of the PCO 111. One or more gas contaminant sensors 109, such as CO2 sensor(s), can be downstream of the VOC sensor(s) 113. The further cleaned air flow can then flow into the fan 110, and then into a mix manifold 104 where it can be mixed with conditioned air from the air conditioning subsystem 103.

Instead of and/or in addition to flowing through the PCO 112, a part of cleaned air (e.g., <10%) from the contaminant removal subsystem 111 may recirculate back into the subsystem 111 for additional processing such as desorption of gas contaminant(s) from used liquid absorbent, and regeneration of clean liquid absorbent, as further described below.

A controller 114 may be in communication with one or more of the sensors 106, 109, 113, 115 for control over one or more components of the ECS 100, such as fan(s) and/or and valve(s) (not all of which may be shown in FIG. 1).

Figure 2:
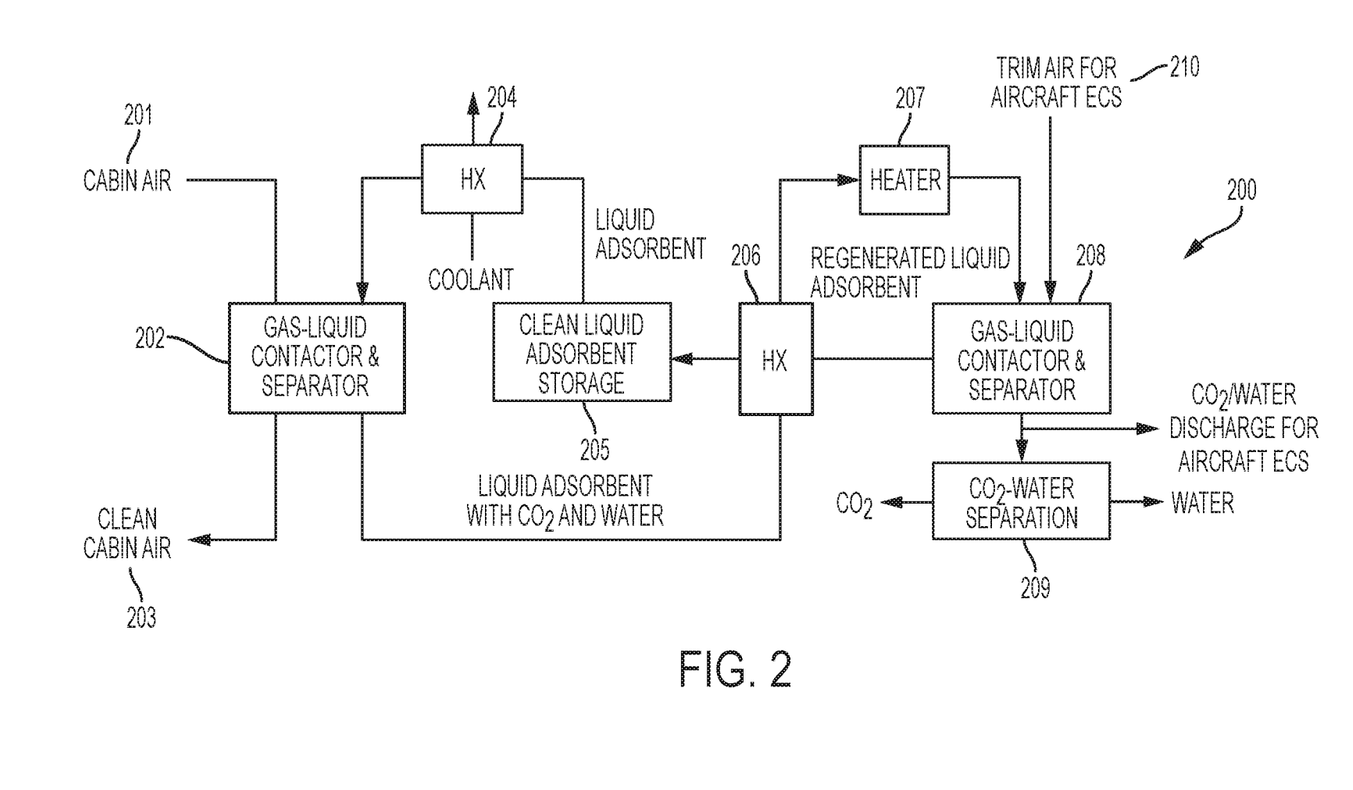
FIG. 2 is a schematic diagram of a system for removing carbon dioxide from air in accordance with an exemplary embodiment of the invention.

FIG. 2 is a schematic diagram of an exemplary contaminant removal subsystem 200 that may be employed in the ECS 100 above and/or in gravity-independent systems. However, other contaminant removal subsystems may be employed. The subsystem 200 may include one or more gas-liquid contactor and separators to effectuate removal of gas contaminant(s), such as those described below. However, the subsystem 200 is not limited to the contactor and separators described below.

The contaminant removal subsystem 200 may receive a contaminated air 201 from an environment, such as a spacecraft cabin. The contaminated air 201 may include one or more gas contaminants such as CO2, and/or H2O, and the air 201 may flow into a first gas-liquid contactor and separator (i.e., scrubber-separator) 202. In embodiments, the contactor and separator 202 are integrated into a single component. In embodiments, the contaminated air 201 may, before entering the scrubber-separator 202, be filtered for dust and particulates, as well as being forced, via a fan, into the scrubber-separator 202.

Concurrent with, or sequentially with, the scrubber-separator 202 receiving the contaminated air 201, a clean liquid absorbent may be pumped, into the scrubber-separator 202, from a clean liquid absorbent storage 205. In embodiments, the liquid absorbent may be one or more ionic liquids described below.

Before entering the scrubber-separator 202, the clean liquid absorbent may be cooled by a heat exchanger 204 disposed between the storage 205 and the scrubber-separator 202.

The scrubber-separator 202 may produce therein a mist of or droplets of cooled, clean liquid absorbent, and may enable mixing and/or contact between the clean liquid absorbent droplets and the contaminated air. In turn, a liquid absorbent having absorbed gas contaminant(s) (i.e., a "used liquid absorbent") may be produced. The used liquid absorbent may also include H2O and/or VOCs.

The scrubber-separator 202 may also enable the production of used liquid absorbent by the use of a rotating porous bed described below. That enablement may be achieved by the rotating porous bed providing a heat/mass transfer surface for contact between clean liquid absorbent and contaminated air.

In addition to the above contact, the porous bed may enable absorption of gas contaminant by (or transfer of gas contaminant to) the clean liquid absorbent (i.e., separation of gas contaminant from the contaminated air 201) to produce used liquid absorbent. However, the present invention is not intended to be limited by the foregoing theories of operation.

From the scrubber-separator 202, a cleaned air 203 may flow back to the environment to be conditioned. In embodiments, the cleaned air 203 may have a gas contaminant(s) concentration, and/or H2O concentration lower than that of the contaminated air 201.

Also from the scrubber-separator 202, used liquid absorbent may exit. The used liquid absorbent may flow into a heat exchanger 206. Therein, the used liquid absorbent may be heated by a regenerated liquid absorbent described below, and next flow into a heater 207 wherein the used liquid absorbent may be further heated. Alternatively, in the context of an aircraft, the used liquid absorbent may be heated by trim air 210.

From the heater 207, a heated, used liquid absorbent may flow into a second gas liquid contactor and separator (i.e., stripper-separator) 208. In embodiments, the contactor and separator 208 are integrated into a single component. The stripper-separator 208 may have the same design as the scrubber-separator 202, or a different design. In the context of an aircraft, the contactor-separator 208 may also be used to discharge (i.e., not recirculate) carbon dioxide and/or water which can be transferred to the trim air 210.

The stripper-separator 208 may produce therein a mist of or droplets of the heated, used liquid absorbent. The stripper-separator 208 can enable desorption of gas contaminant(s) and/or H2O from heated, used liquid absorbent, such as by the use of a rotating porous bed described below, and thereby produce regenerated liquid absorbent.

From the stripper-separator 208, a regenerated liquid absorbent may exit. In embodiments, a gas contaminant concentration in the regenerated liquid absorbent is lower than that of the used liquid absorbent. The regenerated liquid absorbent may flow into the heat exchanger 206 wherein the regenerated liquid absorbent may be cooled by used liquid absorbent.

Concurrent with the stripper-separator 208 outflowing the regenerated liquid absorbent, the stripper-separator 208 may outflow gas contaminant(s), regenerated liquid absorbent, the stripper-separator 208 may outflow gas contaminant(s), such as CO2, and/or H2O, into a separator 209, which may be of a hollow membrane design or a condenser-separator design. In embodiments, the gas contaminant(s) and/or H2O may be recovered and reused.

Figure 3:
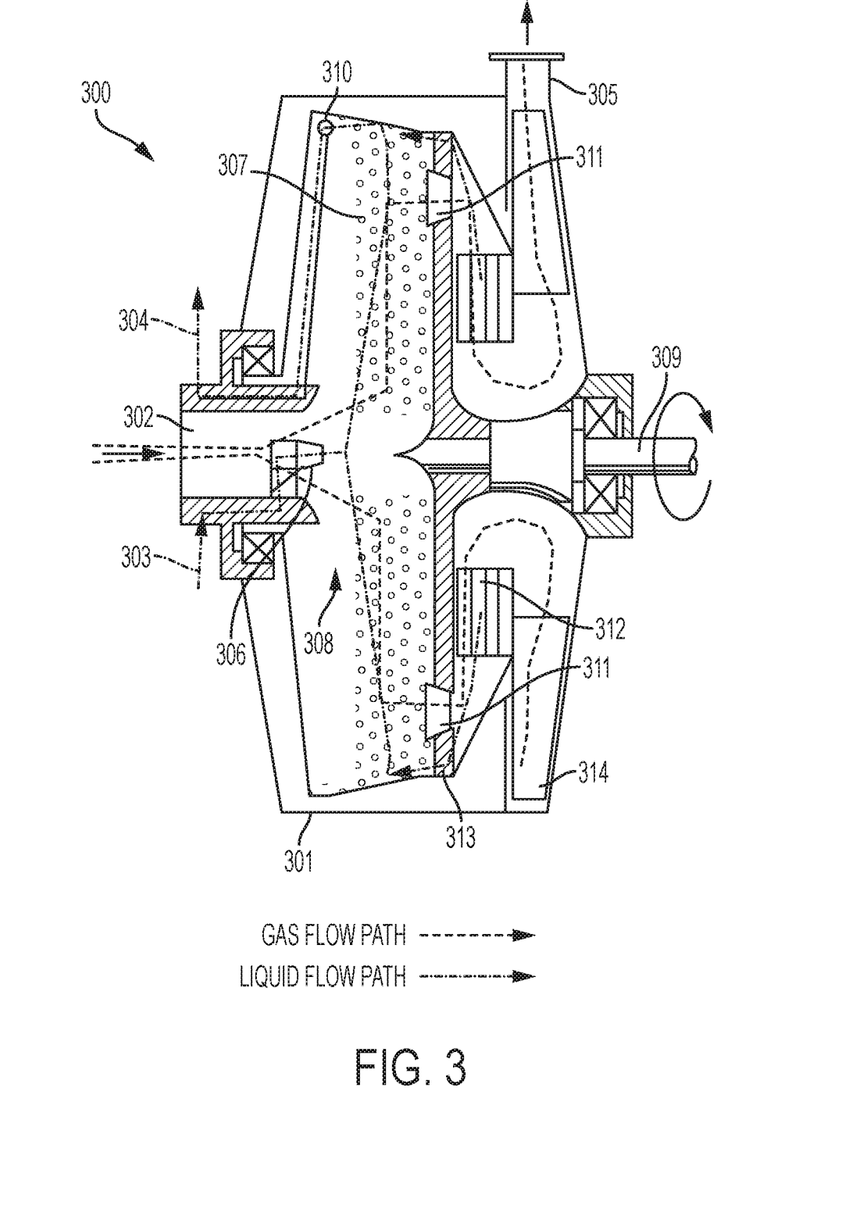
FIG. 3 is a cross-sectional view of a rotating gas-liquid contact separator in accordance with an exemplary embodiment of the invention.
Figure 3A:
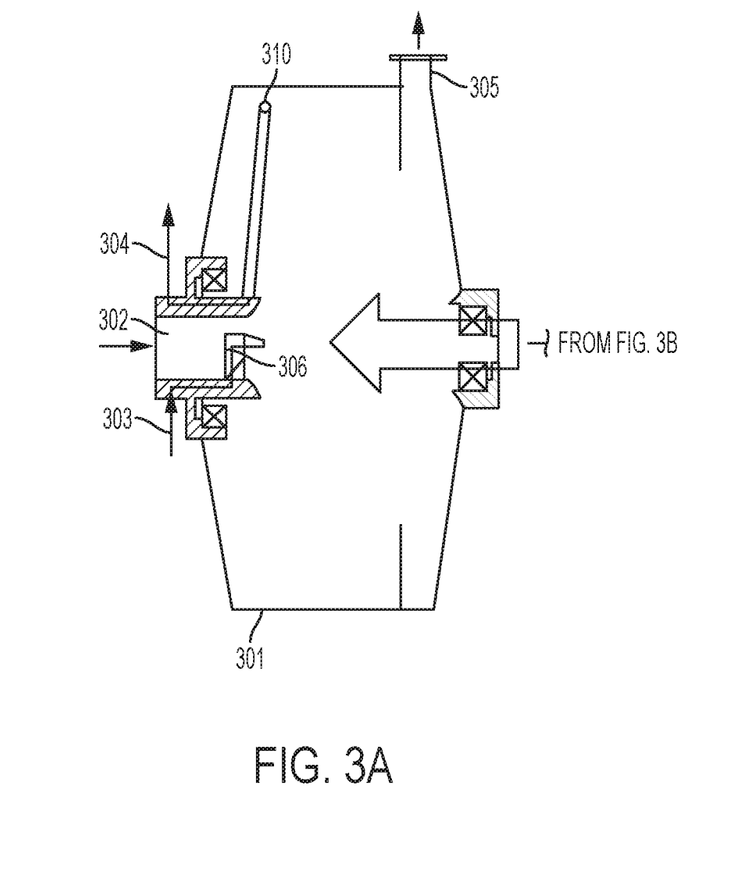
Figure 3B:
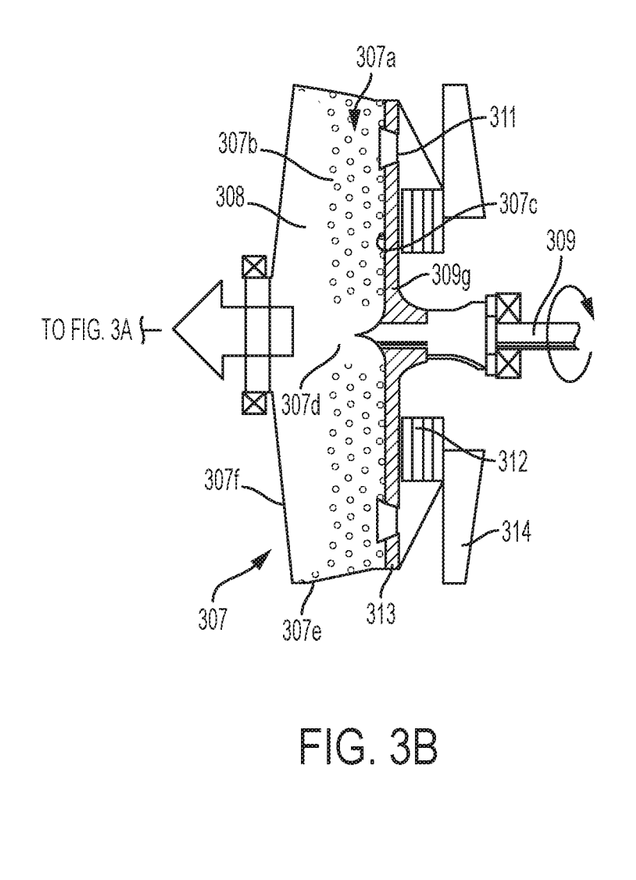

FIGS. 3, 3A and 3B show an exemplary embodiment of the scrubber-separator 202 and/or stripper-separator 208. For ease of discussion, the scrubber-separator 202 and stripper-separator 208 will be referred to as a "contactor-separator" 300. In this exemplary embodiment, the functions of gas-liquid contact and gas-liquid separation are integrated into a single component 300. In embodiments, the contactor-separator 300 is gravity independent for gas-liquid contact and/or separation.

The contactor-separator 300 may include a housing 301 and, at a first side thereof, a contaminated air inlet 302, a liquid absorbent inlet 303, and a liquid absorbent outlet 304. At a second and opposite side of the housing 301 may be a gas contaminant outlet 305.

Within the contaminated air inlet 302 can be a liquid spray nozzle 306 that can create a mist or spray of clean liquid absorbent droplets. In embodiments a flow of contaminated air from the inlet 302 and a flow of clean absorbent droplets from the nozzle 306 may flow in substantially the same direction, i.e., co-currently.

In embodiments, contaminated air may flow out of the inlet 302 at a pressure of from between about 12 to about 16 psia. In embodiments, clean liquid absorbent may flow out of the inlet 303 at a pressure of from between about 20 to about 60 psia.

In embodiments, the nozzle 306 may produce a spray or droplet pattern in a conical configuration for gas liquid contact.

A rotating bed 307 may interface the nozzle 306. In embodiments, a distance between the rotating bed 307 and the nozzle 306 may be between about 2 to about 6 inches.

Between the nozzle 306 and the rotating bed 307 may be a mixing and/or contact area 308 where droplets of clean liquid absorbent may mix with and/or contact contaminated air. In embodiments, the liquid absorbent droplets and the contaminated air may, before reaching the bed 307, be in the contact area 308 during a contact time. Such contact may produce droplets of used liquid absorbent. In embodiments, the contact area 308 may have a circumference substantially equal to a circumference of the rotating bed 307, and a depth substantially equal to the distance between the rotating bed 307 and the nozzle 306.

The rotating bed 307 may be shaped in the form of a disk, as an example. In embodiments, the bed 307 may be made of a material that can be easily wetted by the liquid absorbent.

The rotating bed 307 (FIG. 3A) may include a porous portion 307a having a plurality of pores therein and which portion 307a can extend from a first or top surface 307b (that interfaces and is opposite the nozzle 306) and to a second or bottom surface 307c, the surface of the rotating disk 307g of the bed 307 (that is opposite the top surface). A lateral peripheral edge or portion 307e of the bed 307 may also have pores therein and which portion 307e can extend from the top surface 307b and to a substantially non-porous peripheral edge or portion 307f. A central portion 307d of the bed 307 may be substantially void of pores.

In embodiments, the rotating bed 307 may provide a heat/mass transfer surface for contact among the droplets of used liquid absorbent formed in the contact area 308. Also, in embodiments, the bed 307 may provide a heat/mass transfer surface for contact between the clean liquid absorbent and contaminated air. Such contact may thereby produce used liquid absorbent.

Further, in embodiments, the rotating bed 307 may provide a heat/mass transfer surface for separation of gas contaminant from contaminated air by virtue of clean liquid absorbent droplets absorbing gas contaminant in the contaminated air. Used liquid absorbent may be thereby produced. In embodiments, the bed 307 may also coalesce droplets of used liquid absorbent to liquid film for easy gas/liquid separation.

However, the present invention is not intended to be limited by the above theories of operation.

The bed 307 may rotate about a shaft 309. Rotation of the bed 307 can enable/enhance the above contact between clean liquid absorbent and contaminated air and/or separation of gas contaminant from contaminated air. Also, as the bed 307 rotates, centrifugal force may enable/cause clean and/or used liquid absorbent, which may be in the form of a film, in the bed 307 to migrate to the lateral peripheral edge 307e. In embodiments, a majority (e.g., >99%) of used liquid absorbent in the bed 307 may migrate to the edge 307e.

Used liquid absorbent (which may be in the form of a liquid film or stream and did not migrate to the edge 307e) and/or contaminant gas that has separated from contaminated air and/or the contaminated air may exit the bed 307 via one or more outlets 311. From the outlet(s) 311, contaminant gas and/or contaminated air and/or used liquid absorbent may enter a rotating separator 312, such as a porous media, that can separate gas and/or air from liquid. Separated gas/air may exit the contactor-separator 300 via a fan 314 and then the outlet 305. Separated liquid (i.e., used liquid absorbent) may be subjected to the centrifugal forces of the rotating separator 312 and/or bed 307 and thus migrate, via one or more return holes 313, towards the lateral peripheral edge 307e.

Adjacent the lateral peripheral edge 307e may be a pitot scoop pump 310 that may utilize a pressure differential to collect separated liquid at the edge 307e. The collected liquid may then exit the contactor-separator 300 at the outlet 304.

The pitot pump 310 can include a closed rotating case (e.g., the rotating bed 307) and a stationary pitot tube with its inlet positioned near the lateral peripheral edge 307e of the rotating bed 307 as shown in the FIG. 3. The used liquid adsorbent near the peripheral edge 307e is spun up to approximately the rotational speed of the rotating bed 307, and then impacts the inlet of the pitot scoop pump 310 near the peripheral edge 307e. The used liquid adsorbent is discharged through the inner passageway of the pitot scoop pump 310 and exits via the liquid absorbent outlet 304. The pressure of the liquid adsorbent at the outlet 304 is about the sum of both the static pressure head created by the centrifugal force and the velocity head.

Figure 4:
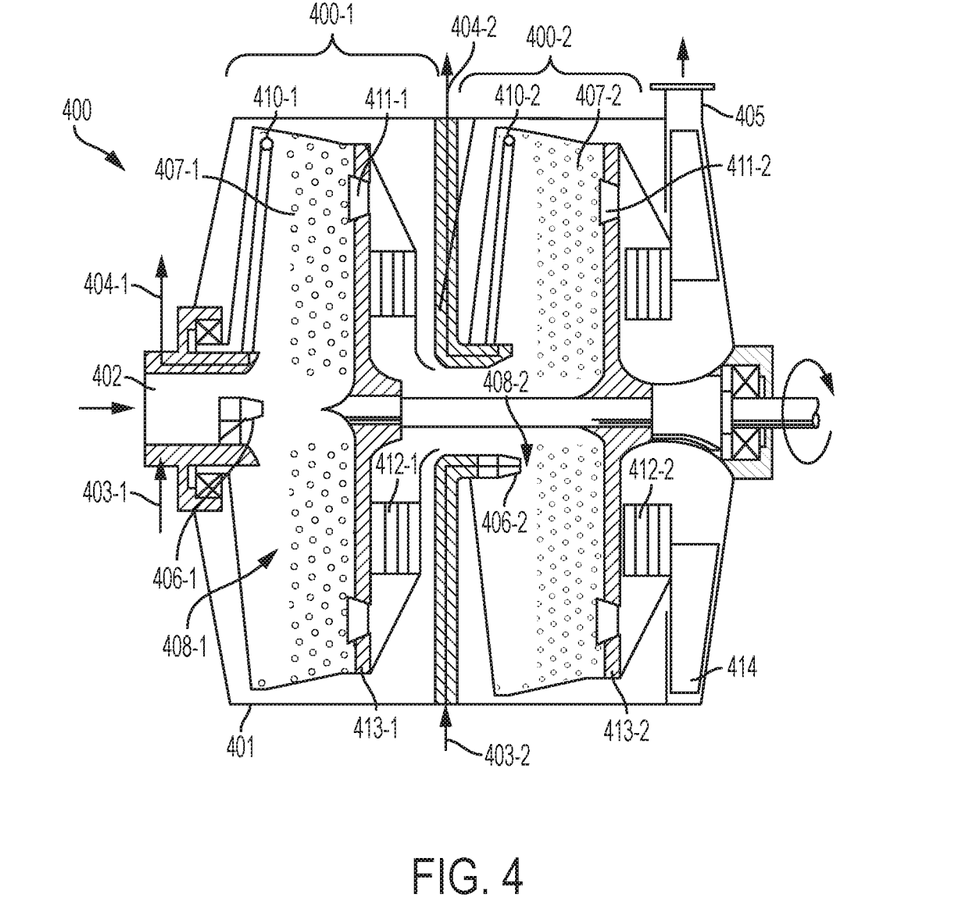
FIG. 4 is a cross-sectional view of another embodiment of a rotating gas-liquid contact separator in accordance with the invention, which has two contact/separation stages.

FIG. 4 shows another exemplary embodiment of the scrubber-separator 202. For ease of discussion, the scrubber-separator 202 will be referred to as a "contactor-separator" 400. In this exemplary embodiment, the functions of gas-liquid contact and gas-liquid separation are integrated into a single component 400. In embodiments, the contactor-separator 400 is gravity independent for gas-liquid contact and/or separation.

The contactor-separator 400 can be similar in design and function as the contactor-separator 300. The latter may be described as having a single stage, whereas the former may be described as having multiple stages. A stage may be a phase of gas-liquid contacting and separation.

In embodiments, the contactor-separator 400 may have two stages 400-1 and 400-2 that may operate sequentially and/or concurrently. The two stages may be essentially identical to one another in design and function. Accordingly, each stage may enable contacting of contaminated air with liquid absorbent, and then separation of gas contaminant from liquid absorbent. The two stages may respectively include essentially the same components, such as liquid absorbent inlets 403-1, 403-2; liquid absorbent outlets 404-1, 404-2; liquid spray nozzles 406-1, 406-2, rotating beds 407-1, 407-2; contact areas 408-1, 408-2; pitot scoop pumps 410-1, 410-2; outlets 411-1, 411-2; separators 412-1, 412-2; and return holes 413-1, 413-2.

In embodiments of the above contactor-separators 300, 400, interfacial surface area of the contaminated air and liquid absorbent can be increased by spraying the liquid through the contaminated air and then coalescing the liquid using a high surface area media. This spraying may increase the rate by which the liquid absorbent absorbs gas contaminant (e.g., carbon dioxide) from the air by increasing the surface area. Since the chosen absorbent may also remove water, the contactor-separator can control humidity of the air stream.

In embodiments, many contaminants, including ammonia and acid gases, can also be removed by the liquid absorbent. Additional contaminants such as volatile organic compounds may also be removed if they are soluble in the liquid absorbent. For volatile organic compounds that are not soluble in the liquid absorbent, a photocatalytic oxidizer (PCO) can be included upstream from the contactor-separator to eliminate them. The contactor-separator also separates the liquid absorbent from clean air and allows the clean air to be returned to the environment to be conditioned. This clean air may pass through a final filter to ensure that no trace liquid absorbent or particles escapes the system.

According to the present invention, the liquid absorbent can meet a demanding set of criteria. The liquid can be safe and nontoxic to humans, and may not contaminate the purified air with odors or organic vapors. It may absorb carbon dioxide at the partial pressure expected during the mission, and may not lose performance when simultaneously absorbing water. It may also be regenerable without the use of space vacuum, so as not to lose CO2 and water to space, and regenerable without using excessive temperatures or power. The liquid may be durable and last without deterioration for the life of the mission.

The liquid absorbent can be one or more ionic liquids. They are salts, generally comprised of an anion and organic cation, which are liquid at their temperature of use. Because they are salts, they have effectively zero vapor pressure, thus eliminating odors and reducing the likelihood of contaminating the purified air. They are generally nontoxic and have sufficient stability to resist deterioration. Ionic liquids generally contain relatively large organic cations (quaternary ammonium or phosphonium compounds) and any of a variety of anions, both of which can be tailored to obtain desired characteristics. Ionic liquids can both physically dissolve carbon dioxide and have specific chemical interactions with it. As a class, almost every ionic liquid is water soluble and hygroscopic, meaning that they will absorb moisture from the air, but due to their negligible volatility, the water can be removed by evaporation either by elevating the temperature or reducing the water partial pressure. Because a very large number of ionic liquids exist, and both the cation and the anion can be tailored to obtain desired characteristics, this class of compounds has flexibility as the liquid absorbent for a carbon dioxide removal system with ability to remove contaminants.

Ionic liquids suitable for use in this invention comprise those with melting points below 0° C., low vapor pressure, and with capacity for carbon dioxide, at 30 deg. C. and in the presence of 3.8 torr carbon dioxide partial pressure, of >1%. Examples of such ionic liquids include 1-ethyl-3-methylimidazolium acetate, 1-ethyl-3-methylimidazolium trifluoracetate, 1-butyl-3-methylimidazolium acetate, tributylmethylphosphonium acetate, triethylmethylphosphonium acetate etc. These ionic liquids are hygroscopic and can absorb water as well and carbon dioxide. Therefore, the effective working fluid can, in many cases, comprise a mixture of the ionic liquids specified and water. It may, under some circumstances, be useful to add water to the ionic liquid before contacting with carbon dioxide. This can reduce the carbon dioxide capacity but also reduce the viscosity.

Figure 8:
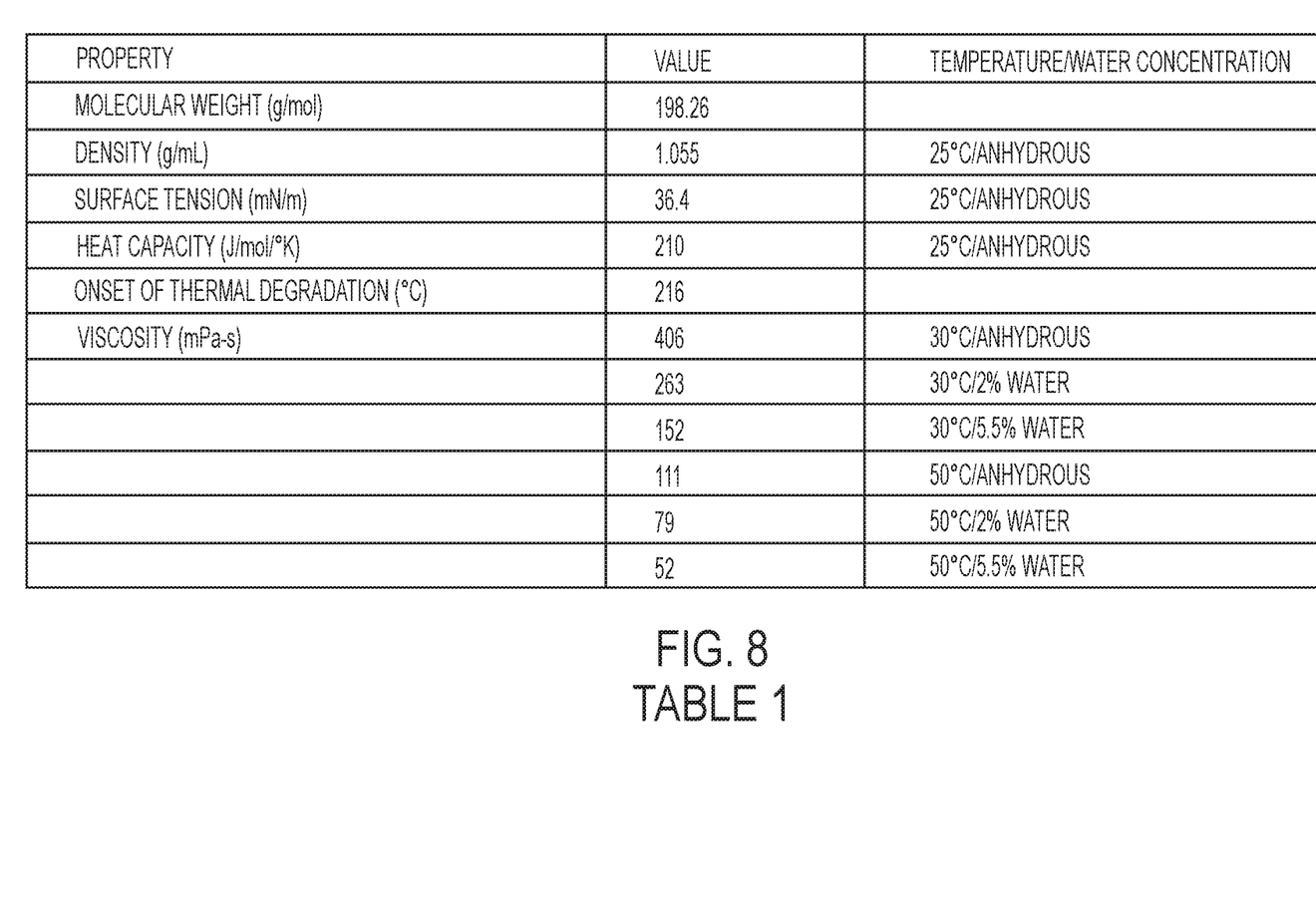
FIG. 8 is a table of properties for BMIM Ac according to an embodiment of the present invention.

1-butyl-3-methylimidazolium acetate (BMIM Ac) has a high CO2 capacity and well understood physical properties. BMIM Ac satisfies the basic requirements for an absorbent in a manned vehicle. It is not a "hazardous substance or mixture", and has no hazards not otherwise classified. The pH of an aqueous solution is 6.1, and the autoignition temperature is 435° C. The compound is a clear, somewhat viscous liquid, and can be handled readily. Other useful physical properties for BMIM Ac are provided in FIG. 8 (Table 1). The surface tension is similar to that for a polar organic solvent, and the density is similar to that for water. The onset for thermal degradation sets the upper temperature limit for processing, and is comfortably higher than the temperature needed for desorption. The viscosity for this ionic liquid is higher than that of water, but can be reduced either by raising the temperature or water content. In normal use, the ionic liquid absorbs both CO2 and water, and therefore the viscosity values vary in the presence of water. Viscosity strongly affects how well the ionic liquid can be distributed into high surface area droplets or media, and also plays a role in determining mass transfer rates for CO2 adsorption and desorption. Control of viscosity can therefore reduce the weight and volume of the contactor-separator.

Figure 5:
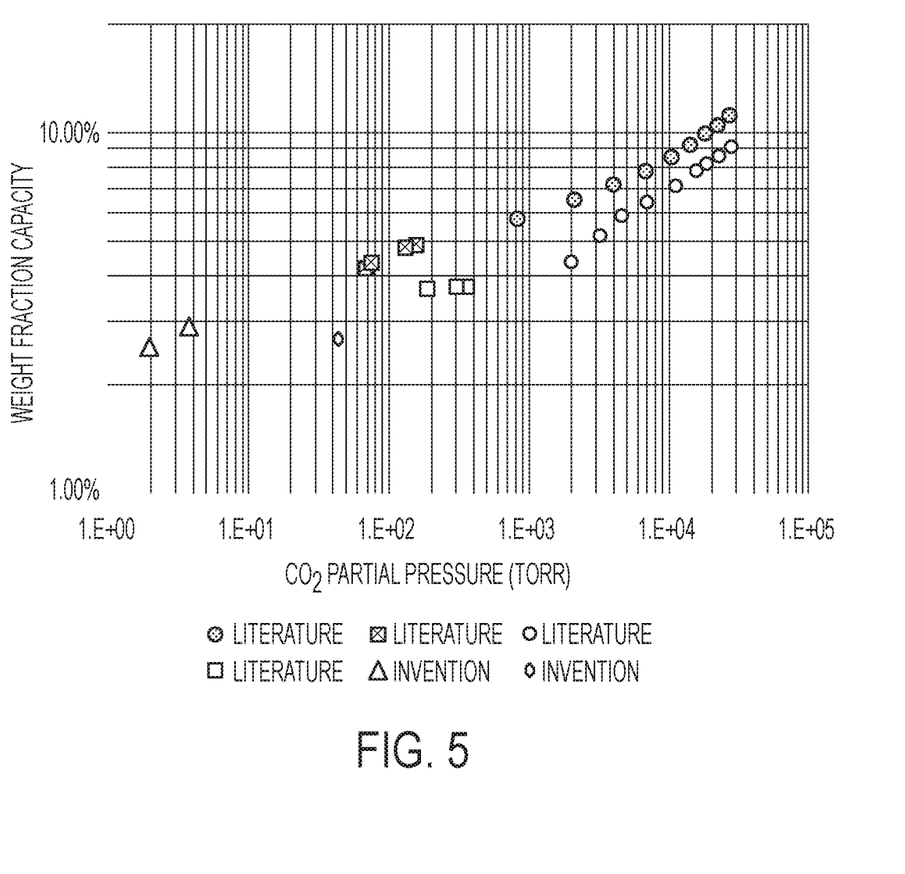
FIG. 5 is a graph of CO2 capacity versus CO2 partial pressure according to an embodiment of the invention.

FIG. 5 shows a smooth relationship between CO2 capacity and CO2 partial pressure for BMIM Ac, referred to as an isotherm curve. The isotherms do not reflect linear dependence of capacity on CO2 partial pressure as described by Henry's law, but instead resemble the isotherms normally observed for adsorption by solid adsorbents. This reflects the fact that, for this ionic liquid, the interaction between the ionic liquid and carbon dioxide is believed to involve formation of a chemical complex. Increasing the temperature has the expected effect of reducing the capacity. Our experimental measurements at CO2 partial pressures of 3.8 torr (5000 ppm) and 2.0 torr (2600 ppm), both with 1.7% water content, are higher than would have been expected at similar water content based on extrapolation of the literature data measured at higher CO2 partial pressures.

Figure 6:
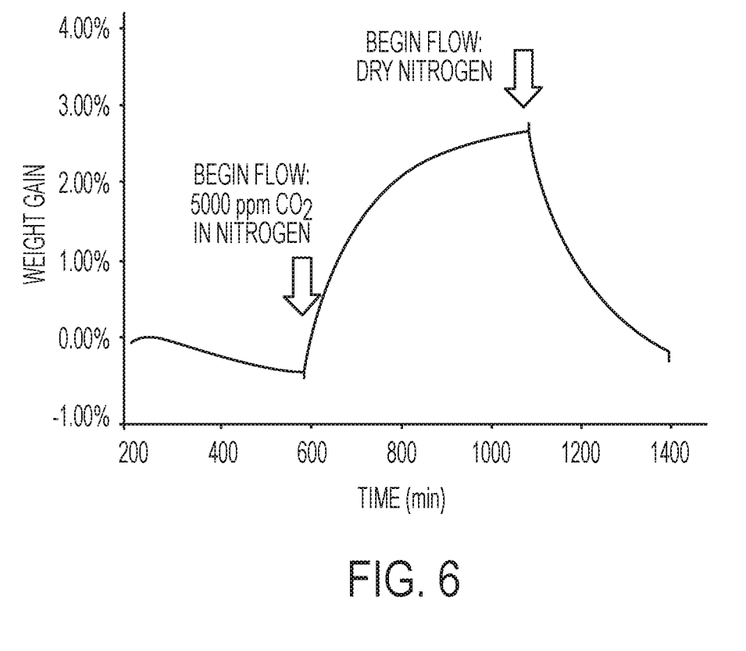
FIG. 6 is a graph of liquid absorbent weight gain v. CO2 absorption time according to an embodiment of the invention.

Regeneration of BMIM Ac can be straight forward with the proper controls. In our initial experiments using thermogravimetric analysis, we found that simply reducing the partial pressure of CO2 was sufficient to desorb CO2 and reverse the weight gain initially obtained—FIG. 6. This process can be accelerated by elevating the temperature, and the partial pressure reduction can be accomplished by lowering the overall pressure as required for desired performance.

Figure 7:
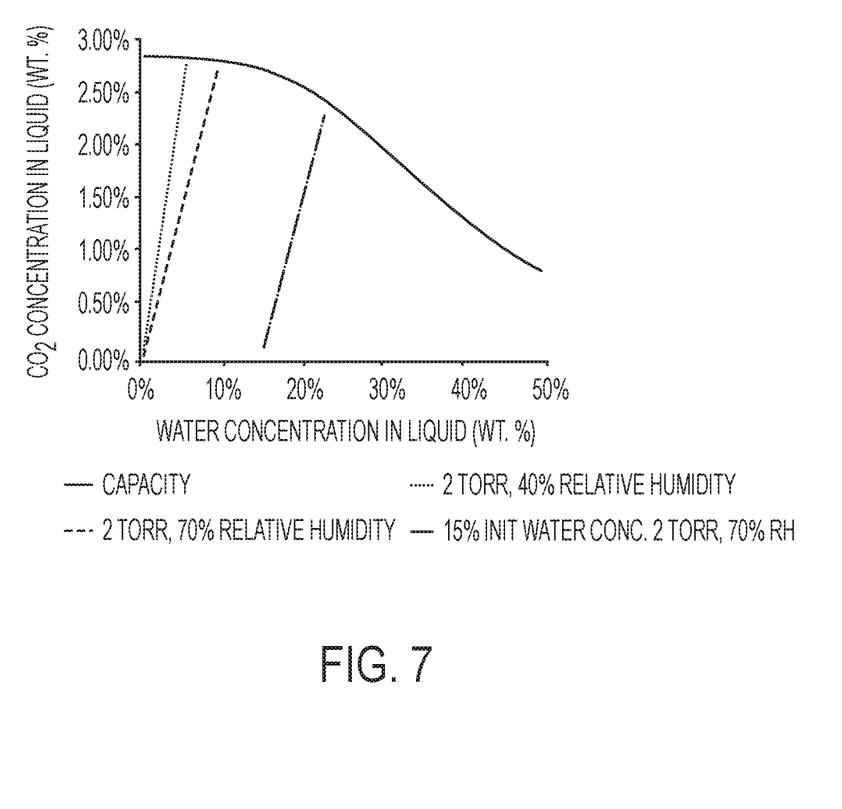
FIG. 7 is a graph of CO2 concentration versus H2O concentration according to an embodiment of the present invention.

In FIG. 7, the predicted carbon dioxide capacity is shown as a function of water content in the ionic liquid, as estimated using a correlation published by S. Baj, T. Krawczyk, A. Dabrowska, A. Siewniak, A. Sobolewski, Korean Journal of Chemical Engineering, 32, 2295-2299 (2015). The remaining dashed and dotted lines in FIG. 7 reflect the concentration of CO2 expected from simultaneous absorption of water and carbon dioxide under various conditions, assuming that 100% of the water and CO2 is absorbed from the feed. The intersection between these lines and the capacity curve estimates the capacity of the ionic liquid under those conditions. Note that, even under worst case conditions, the predicted capacities are not far from the maximum capacity at the indicated CO2 partial pressure. We also learn from FIG. 7 the importance of managing the water concentration in the ionic liquid by appropriate regeneration conditions.

The flow rates of these ionic fluids through the contactor-separators are derived from the mission requirements. For four crew members using average respiration rates, the generation rate of carbon dioxide is 2.88 g/min. Thus, the contactor-separator must also remove 2.88 g/min. If we assume that the cabin partial pressure of CO2 is 2 torr, to remove 2.88 g/min of CO2, the inlet flow rate will be 557 L/min of air. If the ionic liquid absorbs 100% of the CO2 that enters the contactor-separator, the ionic liquid flow rate can be calculated using the capacity of the ionic liquid. Using our measured value of 2.5 wt. % (measured at 1.98 torr), this flow rate of ionic liquid would be at least 115 mL/min. If absorption is less than 100%, this flow rate would increase in proportion.

The size of the contactor-separator needed to remove 2.88 g/min CO2 is determined by the capacity of the ionic liquid for CO2 and the rate of mass transfer of CO2 from the gas phase to the liquid phase. The mass transfer from gas phase to liquid phase depends on the mass transfer coefficient and the gas-liquid mass transfer area. The mass transfer coefficient is expected to be dominated by liquid mass transfer, since mass transfer in the gas phase is rapid. Thus, the mass transfer coefficient depends strongly on the characteristics of the ionic liquid, while the surface area depends on characteristics of the contactor-separator.

CO2 diffusivity in the ionic liquid is expected to be a main parameter that defines the overall mass transfer and the process efficiency. The diffusivity of CO2 in air is very high in comparison with diffusion in the ionic liquid, so the main resistance to CO2 mass transfer is in the liquid phase. Addition of small amounts of water into the liquid decrease the viscosity and increase the diffusivity (and can also decrease film thickness on the rotating bed, thus increasing mass transfer). Addition of water also affects the particle size distribution from a spray nozzle; increased water content leads to a smaller particle size distribution. We have shown that the water content in ionic liquid negatively affects the absorption capacity. However, the effect of water dilution on capacity is expected to be smaller than the positive effect of water dilution on liquid phase mass transfer rate via viscosity reduction, and by increasing the air-liquid surface area. In other words, the dilution of the ionic liquids with water that is inevitable because of the affinity of the ionic liquids for water is expected to increase the mass transfer rate (decrease scrubber size) without greatly decreasing the ionic liquid capacity (i.e. increasing the flow rate of ionic liquid).

Similarly, we have shown that this process relies on exposing a large surface area of ionic liquid to the air stream. In addition to mass transfer, heat transfer will also occur. Note that in FIG. 2 we showed that the ionic liquid entering the scrubber is cooled. This is beneficial because it increases the working CO2 loading capacity, but will also have the effect of cooling the air returning to the cabin. Again, by taking advantage of this process, the load on cooling systems elsewhere in the spacecraft is reduced, resulting in weight and power reductions for these systems.

It is estimated that this system will be a low-maintenance, high-reliability system since the ionic liquid system will not have corrosion problem. In addition, the use of a non-volatile sorbent and a centrifugal separator to create artificial gravity would decrease the likelihood of contamination of the cabin air by sorbent, a problem suffered both by current CO2 removal system.

In addition to reducing the launch costs associated with the use of the ionic liquid system, the new system would also reduce the mass of consumables. The direct liquid contact system would not vent to space and would not have a connection to space vacuum. The use of the open-loop CO2 removal systems typically used in short-duration missions has also been considered for long-duration missions due to their simplicity and low size, weight and power. However, these devices would require an even greater launch cost due to consumables. Anderson, M. A., Ewert, M. K., Keener, J. F., Wagner, S. A., Stambaugh, I.C. NASA Report TP-2015-21870, Johnson Space Center, March, 2015 estimated that the use of an open-loop system would require a total of 21 kg/crewmember/day of potable water, oxygen, and the tanks to store them, or a total of about 75,600 kg for a 30 month mission to Mars with 4 crewmembers.

The combination of direct liquid contact and novel ionic liquids can provide an integrated carbon dioxide, humidity and trace contaminant removal system with a significantly lower size, weight and power compared to current systems. This system gains its advantage from the use of ionic liquid as the liquid absorbent. Liquid systems eliminate the mass transfer limitations and plumbing complexities of alternative solid adsorbents, and avoid contamination of the cabin air by the sorbent through the use of ionic liquids, which have zero vapor pressure. In addition to being containable, ionic liquids are flame retardant, non-toxic, and very stable. This sorbent is completely regenerable, without the use of space vacuum or high temperatures, and thus provides NASA with an excellent option for closed-loop CO2 removal on existing and future vehicles.

It should be understood, of course, that the foregoing relates to exemplary embodiments of the invention and that modifications may be made without departing from the spirit and scope of the invention as set forth in the following claims.

We claim:

1. A contaminant removal subsystem configured to receive filtered air from a filter downstream of an environment suitable for humans, wherein contaminated air is discharged from the environment to the filter, and the contaminant removal subsystem is further configured to discharge cleaned air to the environment, the contaminant removal subsystem comprising:
a scrubber-separator that includes a first rotating porous bed;
wherein the scrubber-separator receives the filtered air and a clean liquid absorbent, and discharges the cleaned air and a used liquid absorbent;
wherein the cleaned air contains a lower concentration of gas contaminant than the contaminated air;
wherein the used liquid absorbent includes gas contaminant absorbed into clean liquid absorbent;

wherein the first rotating porous bed separates gas contaminant from contaminated air;
a first heat exchanger directly downstream, in terms of liquid absorbent flow, of the scrubber-separator whereby there is an absence of subsystem components therebetween other than ducting for a flow of fluid;
a heater directly downstream, in terms of liquid absorbent flow, of the first heat exchanger whereby there is an absence of subsystem components therebetween other than ducting for the flow of fluid;
a stripper-separator directly downstream, in terms of liquid absorbent flow, of the heater whereby there is an absence of subsystem components therebetween other than ducting for the flow of fluid;
wherein the stripper-separator is configured to receive air from a source other than the environment;
wherein the stripper-separator desorbs gas contaminant from the used liquid absorbent to produce a regenerated liquid absorbent;
wherein the stripper-separator is directly upstream, in terms of regenerated liquid absorbent flow, of the first heat exchanger whereby there is an absence of subsystem components therebetween other than ducting for the flow of fluid;
a dean liquid absorbent storage directly downstream, in terms of regenerated liquid absorbent flow, of the first heat exchanger whereby there is an absence of subsystem components therebetween other than ducting for the flow of fluid;
a second heat exchanger directly downstream, in terms of regenerated liquid absorbent flow, of the dean liquid absorbent storage whereby there is an absence of subsystem components therebetween other than ducting for the flow of fluid;
wherein the second heat exchanger is directly upstream, in terms of regenerated liquid absorbent flow, of the scrubber-separator whereby there is an absence of subsystem components therebetween other than ducting for the flow of fluid; and
a contaminant gas-water separator downstream, in terms of gas contaminant, of the stripper-separator.

2. The subsystem of claim 1, wherein the used liquid absorbent contains a higher concentration of gas contaminant than the cleaned air.

3. The subsystem of claim 1, wherein the used liquid absorbent contains a higher concentration of gas contaminant than the regenerated liquid absorbent.

4. The subsystem of claim 1, wherein the first rotating porous bed is configured to transfer of gas contaminant to clean liquid absorbent.

* * * * *